United States Patent
Han et al.

(10) Patent No.: US 6,915,233 B2
(45) Date of Patent: *Jul. 5, 2005

(54) APPARATUS AND METHOD FOR MEASURING A WEIGHT LOAD EXERTED BY A LEG OF A LAB ANIMAL OR A HUMAN BEING

(75) Inventors: Hee Chul Han, 23-3 Nonhyun-dong, Gangnam-gu, Seoul 135-010 (KR); Seung Kil Hong, Seoul (KR); Heung Sik Na, Seoul (KR); Young Wook Yoon, Seoul (KR); Yang In Kim, Uneongou-si (KR); Sun Seek Min, Seoul (KR); Jeong Seok Han, Seoul (KR)

(73) Assignee: Hee Chul Han (KR)

( * ) Notice: Subject to any disclaimer, the term of this patent is extended or adjusted under 35 U.S.C. 154(b) by 0 days.

This patent is subject to a terminal disclaimer.

(21) Appl. No.: 10/645,770

(22) Filed: Aug. 21, 2003

(65) Prior Publication Data

US 2004/0039547 A1 Feb. 26, 2004

Related U.S. Application Data

(63) Continuation-in-part of application No. 09/820,536, filed on Mar. 29, 2001, now Pat. No. 6,629,056.

(51) Int. Cl.$^7$ .............................................. G01C 19/00

(52) U.S. Cl. ...................... 702/173; 702/174; 702/175; 177/132

(58) Field of Search ................................ 702/173, 174, 702/175, 127, 128, 129, 182, 186; 177/132, 147, 164, 185, 244

(56) References Cited

U.S. PATENT DOCUMENTS

| | | | | |
|---|---|---|---|---|
| 4,427,083 A | * | 1/1984 | Muddle | 177/132 |
| 4,804,052 A | * | 2/1989 | Griffen | 177/25.14 |
| 5,724,267 A | * | 3/1998 | Richards | 702/174 |
| 5,734,128 A | * | 3/1998 | Gades et al. | 177/244 |
| 6,629,056 B2 | * | 9/2003 | Han et al. | 702/173 |

* cited by examiner

*Primary Examiner*—Bryan Bui
(74) *Attorney, Agent, or Firm*—Gibbons Del Deo, Dolan, Griffinger & Vecchione

(57) ABSTRACT

An apparatus and method capable of measuring a weight load of an inflamed leg of a lab animal or a human being objectively and precisely while the lab animal or the human being is walking freely in a non-binding state. A pathway sized depending on a size and a stride of the lab animal or the human being is provided in a weight load measuring apparatus, and a weight sensor is attached to a bottom of the pathway. Thus, artificial operations to be applied to the lab animal or human being walking the pathway can be minimized such that the weight load exerted in the inflamed leg can be measured objectively and precisely with time periods.

14 Claims, 8 Drawing Sheets

APPARATUS AND METHOD FOR MEASURING A WEIGHT LOAD EXERTED BY A LEG OF A LAB ANIMAL OR A HUMAN BEING

This application is a Continuation-In-Part of application Ser. No. 09/820,536, filed on Mar. 29, 2001 U.S. Pat. No. 6,629,056.

FIELD OF THE INVENTION

The present invention relates to an apparatus and method for measuring a weight load exerted by a leg of a lab animal or a human being. Specifically, the invention relates to an apparatus and method for estimating the degree of pain felt by a lab animal or a human being on the basis of a weight load exerted by a leg suffering diverse inflammation.

BACKGROUND OF THE INVENTION

The most representative symptom reported by patients suffering diseases such as arthritis is pain in the affected area. This pain can aggravate the condition through a neurogenic inflammation. Namely, an arthritic pain due to inflammation in a peripheral tissue stimulates a primary afferent nerve fiber through various mediators that carries the inflammation, and thus excitability of the primary afferent nerve fiber is increased. The increase in excitability reaches spinal neurons, and as a result, hyperalgesia is induced. Therefore, a full knowledge of the pain will play an important role in understanding and overcoming the disease.

There are various behavioral testing methods, using lab animals, for inspecting the degree of pain due to a disease such as arthritis. A method of measuring the degree of pain is disclosed in articles: 1) Larsen et al., "Reduction in Locomotor Activity of Arthritic Rats as Parameter for Chronic Pain: Effect of Morphine, Acetylsalicylic Acid and Citalopram," *Acta Pharmacol. Et Toxicol.*, 57:345–351 (1985); 2) Cain et al., "Pain-Related Disability and Effects of Chronic Pain," *Physiology & Behavior*, 62(1):199–205 (1997); 3) Hallas et al., "Establishment of Behavioral Parameters For The Evaluation of Osteopathic Treatment Principles in a Rat Model of Arthritis," *JAOA*, 97(4):207–214 (1997), and so on. In this method, a decrease of whole activities of a lab animal having arthritis in a leg is expressed numerically by recording changes in the activities of the lab animal through video analysis. The decrease of whole activity of the lab animal is due to an arthritic pain. This method is considered as a highly reliable test because it can quantify the decrease of the whole activities of lab animals. However, defining whether or not whole activities directly relate to the pain is difficult. Also, the method is very expensive and takes much time.

Another method of measuring the arthritic pain felt by a lab animal is disclosed in articles: 1) Sluka et al., "Different Effects of N-methyl-D-Aspartate (NMDA) and non-NMDA Receptor Antagonists on Spinal Release of Amino Acids After Development of Acute Arthritis In Rats," *Brain Research*, 664:77–84 (1994); 2) Lawand et al., "Nicotinic Cholinergic Receptors: Potential Targets for Inflammatory Pain Relief," *Pain*, 80:291–299 (1999); and 3) Lu et al., "Gabapentin Attenuates Nociceptive Behaviors in an Acute Arthritis Model in Rats," *The Journal of Pharmacology and Experimental Therapeutics*, 290(1):214–219 (1999). In this method, arthritis is induced in the right leg of a lab animal such as a rat by injecting kaolin and carrageenan (suspended in normal saline) into the knee joint cavity and then the sole of the right foot is stimulated with heat. Thereafter, latency of leg withdrawal response to the heat is measured as a degree of the pain. However, the response of the leg with respect to the heat is considered as a secondary hyperalgesia that inflammation of the knee affects the leg by sensitization of central neuron. Therefore, ascertaining whether or not the method measures the pain caused by the inflammation induced in the knee is difficult.

Further, alternative methods of evaluating inflammation caused in a leg by threshold for vocalization or local temperature are known. The threshold value is measured when an inflamed leg of a lab animal is stimulated with pressure and thus the lab animal shrieks with pain, and the local temperature is measured at an inflamed portion. However, the threshold value and the local temperature are not objective and quantitative factors for representing change in primary behavior aspect induced by the pain.

In order to conduct a more accurate behavioral test, a method of evaluating an arthritic pain using decrease of a weight load applied in an inflamed leg of a lab animal is disclosed in articles: 1) Okuda et al., "Arthritis Induced in Cat by Sodium Urate: A Possible Animal Model for Tonic Pain," *Pain*, 18:287–297 (1984); 2) Clarke, K. A., "Differential Fore-and Hindpow Force Transmission in the Walking Rat," *Physiology & Behavior*, 58(3):415–419 (1995); 3) Clarke et al., "Gait Analysis in a Rat model of Osteoarthrosis," *Physiology & Behavior*, 62(5):951–954 (1997); and 4) Schott et al., "Weight Bearing as an Objective Measure of Arthritic Pain in the Rat," *Journal of Pharmacological and Toxicological Methods*, 31(2):79–83 (1994). Such a method is based on the fact that the weight load applied in the inflamed leg is decreased due to the arthritic pain. The decrease of the weight load is considered as an objective and quantitative index for representing change of primary behavior aspect induced by the pain. However, typically, the weight load of the inflamed leg of the lab animal is measured under the condition that the lab animal is made to stand up or remain a stationary state. In this case, the lab animal is stressed because it cannot move. As a result, the decrease of the weight load is changed depending on a pose or a stress of the lab animal. In addition, the decrease of the weight load appears more precisely when the lab animal is moving freely. Therefore, it is necessary to minimize artificial restraining or manipulations of experimental animals during measuring of the weight load.

In clinical situation, arthritic pain has been measured indirectly by patient's subjective appeal. If there is a method or device that could objectively measure arthritic pain, the degree of objective pain will be accepted as an index of effect of therapeutic intervention. Therefore, it is necessary to measure objectively the degree of arthritic pain in the clinical situation.

SUMMARY OF THE INVENTION

It is, therefore, an objective of the present invention to provide an apparatus and method for measuring the weight load of an inflamed limb of a lab animal or a human being objectively and precisely while one of the lab animal or human being is walking freely in a non-binding state.

In accordance with one aspect of the present invention, there is provided an apparatus for measuring a weight load of a human being, comprising: a long-box comprised of side-walls and a bottom, wherein the bottom is comprised of a plurality of independent plates, the plates defining a pathway upon which the human being moves freely; a plurality of weight sensors for measuring the weight load exerted by an individual leg of the human being, wherein each of the plurality of weight sensors is independently attached to a corresponding plate of the plurality of plates on the bottom of the long-box and independently measures the weight load while the human being walks freely; and a signal processor for processing an electric signal from each of the plurality of weight sensor order to provide a result of the measured weight.

In accordance with another aspect of the present invention, there is provided a method of measuring a weight load of a human being, comprising the steps of: (a) providing a long-box comprised of side-walls and a bottom, wherein the bottom is comprised of a plurality of independent plates, the plates defining a pathway upon which the human being moves freely; (b) allowing the human being to move through the long-box; (c) measuring a weight load exerted by an individual leg of the human being through a plurality of weight sensors, wherein each of the plurality of weight sensors is independently attached to a corresponding plate of the plurality of plates on the bottom of the long-box and independently measures the weight load while the human being walks freely; and (d) processing an electric signal from each of the plurality of weight sensors to provide information relating to the weight load.

In accordance with still another aspect of the present invention, there is provided a method of analyzing effects of an analgesic drug and/or a medical treatment on an inflamed leg of a human being, comprising the steps of: (a) providing a box which includes a plurality of sensors attached to a bottom of the box; (b) directing the human being to walk; (c) measuring independently a first weight load exerted by the inflamed leg and a second weight load exerted by a normal leg; (d) injecting an analgesic drug into and/or applying a medical treatment on the inflamed leg; (e) measuring a third weight load exerted by the inflamed leg and a fourth weight load exerted by the normal leg, after the human being walks voluntarily through the box; (f) computing a first ratio of the first weight load to the second weight load and a second ratio of the third weight load to the fourth weight load; (g) calculating a difference between the first and second ratios; and (h) determining the effects of the analgesic drug and/or the medical treatment before and after the administration of the analgesic drug into and/or the application of the medical treatment on the inflamed leg, on the basis of the calculated difference.

In accordance with yet another aspect of the present invention, there is provided a method of evaluating severity of pain in an inflamed leg of a human being, comprising the steps of: (a) measuring a first weight load exerted by the inflamed leg and a second weight load exerted by a normal leg, wherein the measuring step (a) further comprises the steps of: (i) providing a long-box comprised of side-walls and a bottom, wherein the bottom is comprised of a plurality of independent plates, the plates defining a pathway on which the human being moves freely; (ii) directing the human being to move through the long-box; (iii) detecting the first and second weight loads exerted by the inflamed leg and the normal leg, respectively, of the human being through a plurality of weight sensors, wherein each of the plurality of weight sensors is independently attached to a corresponding one of the plurality of plates on the bottom of the long-box and independently measures the weight load; and (iv) processing electric signals from the plurality of weight sensors to provide information relating to the first and second weight loads exerted by the inflamed leg and the normal leg of the human being, and (b) evaluating severity of pain on the basis of the information relating to the first and the second weight loads, wherein the evaluating step (b) further comprises the steps of: (i) computing a ratio of the first weight load to the second weight load; and (ii) comparing the ratio with a predetermined number to grade the severity of pain.

BRIEF DESCRIPTION OF THE DRAWINGS

The above and other objects and features of the present invention will become apparent from the following description of preferred embodiments given in conjunction with the accompanying drawings.

DETAILED DESCRIPTION OF THE PRESENT INVENTION

Figure 1:
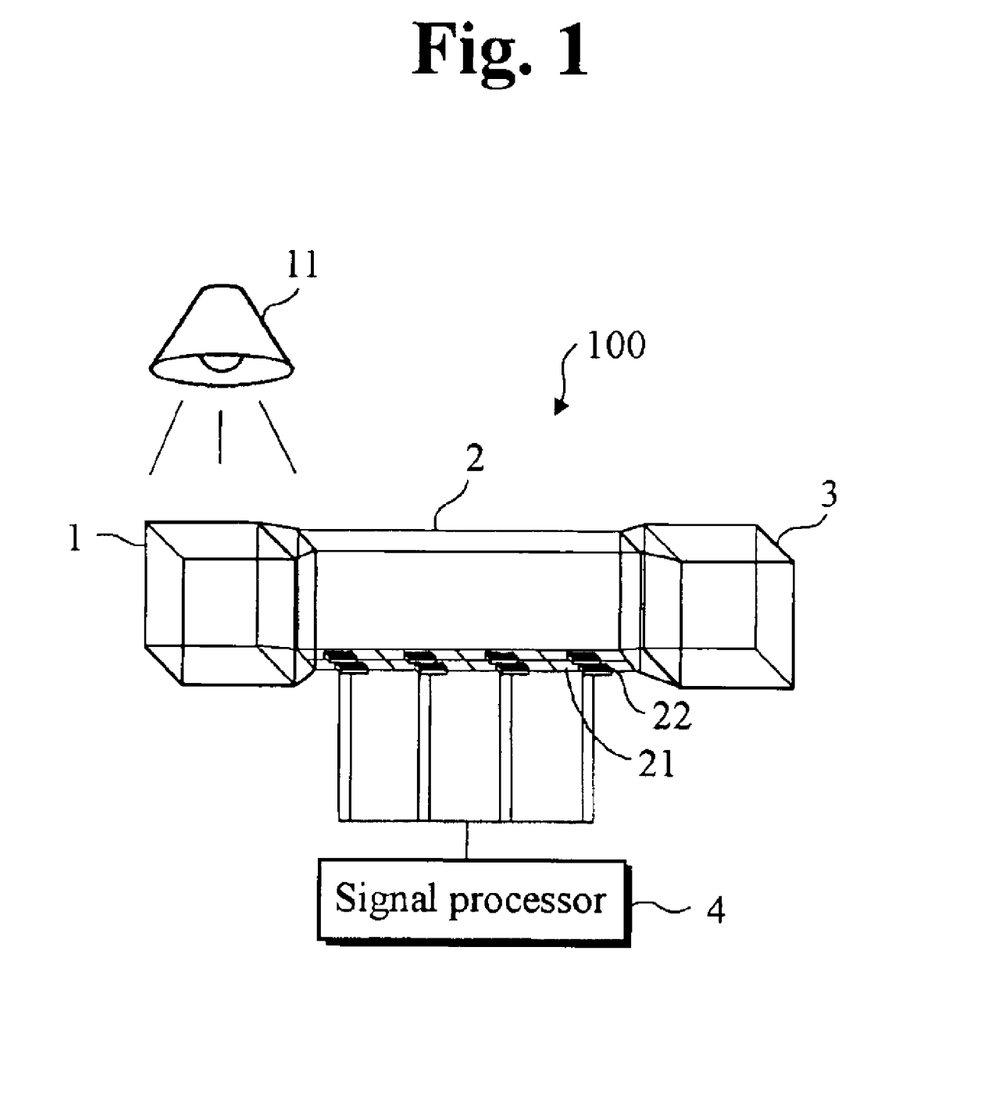
FIG. 1 shows an apparatus for measuring a weight load exerted by a foot of a lab animal in accordance with one embodiment of the present invention.

Referring to FIG. 1, which shows an apparatus for measuring a weight load on a foot of a lab animal in accordance with one embodiment of the present invention. Apparatus 100 comprises starting box (or cage) 1, pathway 2, arrival box 3, and signal processor 4. Except for signal processor 4, they are sized to comfortably accommodate test animals considering their size and stride. They are made of transparent materials such as acrylic resin to allow an easy observation of the movement of the animals from outside.

Starting box 1 is capable of accommodating a test animal such that the animal can freely move about in any directions and it is opened to pathway 2. Further, light 11 is set over starting box 1 to induce a nocturnal animal to move away from starting box 1 onto pathway 2. The side-walls of pathway 2 are built with two movable acrylic plates such that they can travel either toward or away from each other. The effect is that the cross-sectional area along the direction perpendicular to the length of pathway 2 can be adjusted for animals of different sizes. For each animal, pathway 2 should be narrow enough so that the animal would walk straight. In other words, the narrow path prevents a zig-zag walking pattern. The bottom of pathway 2 consists of plates or so-called footholds 21, which are detached from each other such that an action on a foothold does not affect other footholds at all. Footholds 21 are lined up in two rows.

Preferably, each row has at least four plates in order to use a mean of measured weight loads, which is statistically more reliable. In general, the number of footholds 21 in one row should be selected to give a meaningful mean. The distance between the centers of each pair of footholds 21, one from each row, is adjusted to be about the same as the distance between the front (or rear) two legs of the tested lab animal. With this design of pathway 2, the lab animal is made to walk with the left feet stepping only on the left low of footholds 21 and the right feet stepping only on the right row of footholds 21. Weight sensor 22 is attached to each of footholds 21 to record the weight load applied thereto when the animal steps on each of footholds 21. Weight sensor 22 may be a load cell that converts a weight load applied thereon into an electric signal. In this case, the load cell may be a strain gauge, which converts pressure into an electric signal. Signal processor 4 receives the electric signal generated by weight sensor 22 and processes it to express the weight load numerically.

Figure 2:
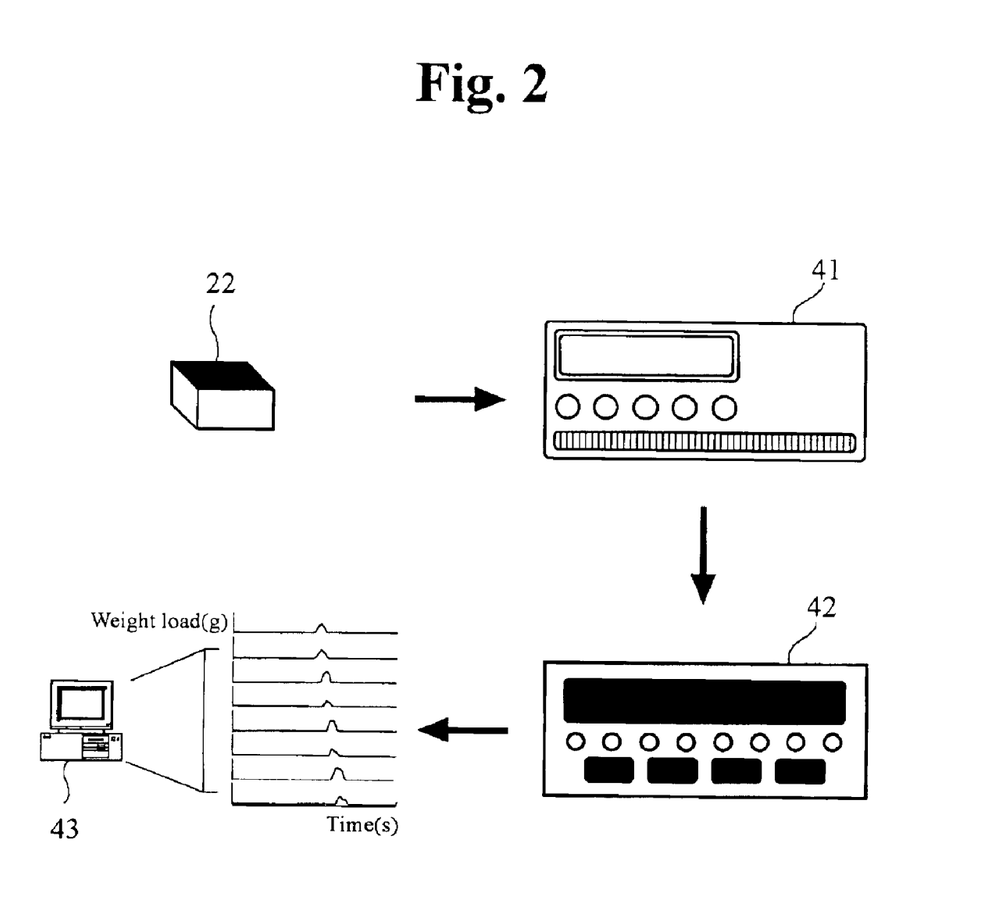
FIG. 2 illustrates a schematic diagram of a signal processor in accordance with the present invention.

Referring to FIG. 2, which illustrates a schematic diagram of signal processor 4 in accordance with the present invention. As shown, signal processor 4 includes signal amplifier 41, analog-to-digital (A/D) converter 42, and computing device 43. Signal amplifier 41 is connected to weight sensor 22 to amplify and filter an electric signal therefrom. In this case, it is desirable to calibrate the amplifying factor of signal amplifier 41 to ensure that a response of weight sensor 22 is directly proportional to the weight load. A/D converter 42 is connected to the output of signal amplifier 41. Any known A/D converter may be used. Computing device 43 receives the output of A/D converter 42 to numerically compute the weight load corresponding to the pressure applied to weight sensor 22. Further, computing device 43 may provide a time-weight graph, which represents the sensed weight with respect to time.

Referring back to FIG. 1, it is preferable that arrival box 3, similar to starting box 1 in size and shape, is kept dark inside to motivate the test subject to come toward when the animal is more or less nocturnal. Depending on the nature and characteristic behavior of a lab animal, other means of enticing may be employed. What is important is to make the lab animal walk in a uniform manner.

Now, a method of evaluating the degree of pain, felt by a lab animal due to arthritis in a leg, using apparatus 100 is described in detail. Though arthritis is cited here as a cause of disabling free exercise of a limb, the present invention may be used to assess the severity of pain by other illnesses affecting motor skills of a subject.

Figure 3:
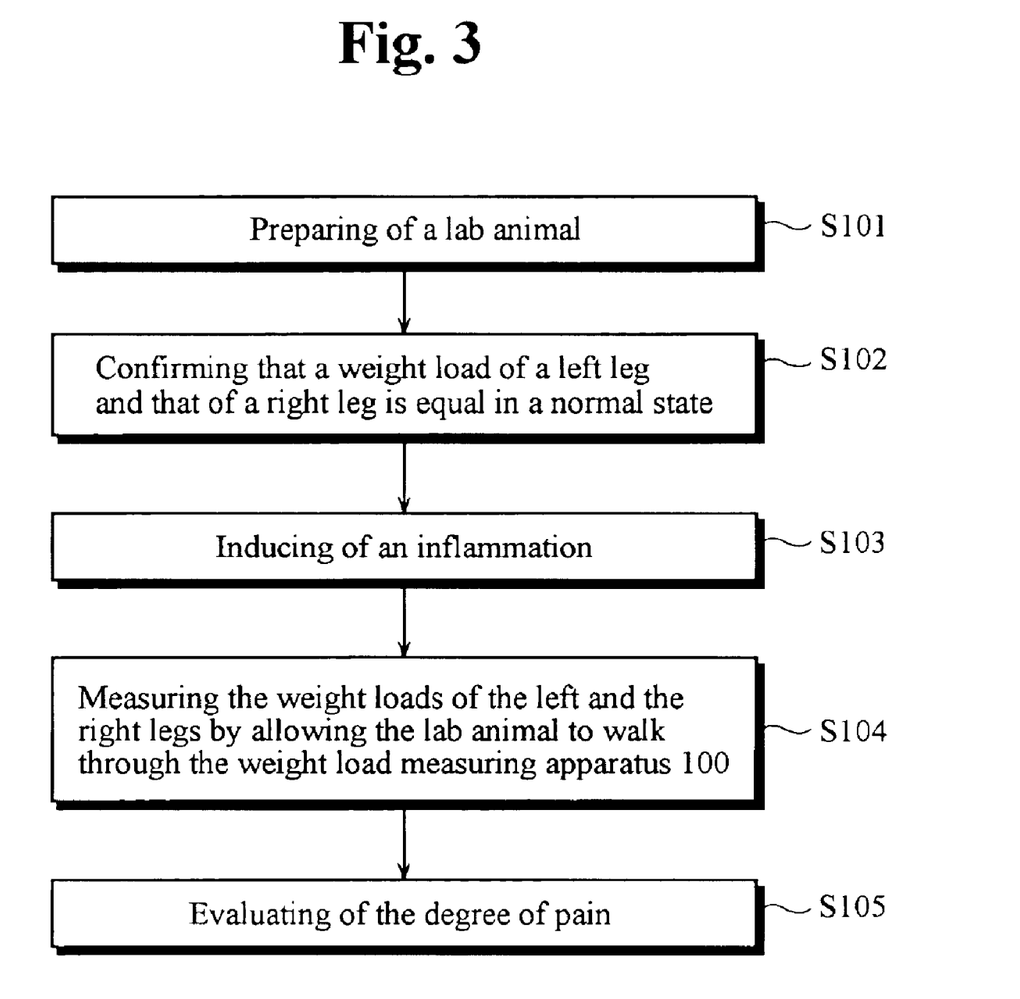
FIG. 3 is a flow chart of a method for evaluating the degree of pain in accordance with the present invention.

Referring to FIG. 3, which shows a flow chart illustrating how the present invention is used for measuring weight loads on the legs in free walking. Firstly, laboratory or "lab" animals, for examples, rats or guinea pigs, are conditioned or trained (step S101). In an experiment utilizing the present invention, Sprague-Dawly species of rats were used. The following description of the method will be made referring to those rats as representative lab animals. The rats are raised under the condition that day and night alternate every 12 hours until they are about eight months old weighing 180–200 g. Water was deprived from 12–24 hours before each weight load test session until the end of it to induce the thirsty rat to move toward water. They are screened to select those suitable for apparatus 100. After then, they are randomly divided into two groups. Those to be arthritic in their legs are placed in a "test group" and the remaining ones are placed in a "control group."

Then, in order to confirm that a weight load exerted by one of the front (or rear) two legs is equal to that by the other of the two legs before injection of an inflammation-causing agent, the animals in the test group are made to walk through apparatus 100 (step S102), now to be referred to as a test group or test animals.

Thereafter, arthritis is induced in any one leg, for example, a right hind leg, of every animal in the test group (step S103). For example, 50 $\mu$l of 2% carrageenan suspended in sterile saline, is injected into the knee joint cavity of a leg under gaseous anesthesia. In contrast, control animals are injected with an agent that does not induce arthritis or placebo, for example, 50 $\mu$l saline into their knee joint cavities of the animals in the control group.

The weight loads on the left hind and right hind legs of both groups are continually measured for a period of time (step S104). For the purpose, the animals are made to voluntarily walk from starting box 1 to arrival box 3 one at a time. Illuminating starting box 1 with a bright light and placing a water bowl (not shown) in arrival box 3 helps such a voluntary walk in those water-deprived-of rats that are also known to shy away from light. Then, the weight loads on footholds 21 are measured as sensed by weight sensors 22 as the experimental animals walk through pathway 2. Only those footholds 21 that received the whole foot are taken into account for consistency. For this, lab technicians may closely watch the animal walk. Or the monitored foot may be slightly dipped into a pool of ink or paint prior to the walking so that the foot would leave footprints on footholds 21 as the animal walks.

The measured weight loads are normalized. In other words, the weight loads measured on a given day are expressed in terms of its ratio to the total body weight taken on the same day. Then, in order to verify reliability of the measured weight loads, a well known repeated-measures ANOVA (analysis of variance) test is conducted to check the presence of significant variance among data obtained from a given test group at different points of time and among data obtained from different test groups at a corresponding time point. Well-known post-hoc comparison tests are further performed to identify the source(s) of the variance. In this case, $P<0.05$ is considered significant. After then, a mean of the five measured weight loads is computed for each of the left and right legs. This step S104 may be performed periodically, i.e., every two hours, four hours, five hours, and so on after the inflammation was induced.

Figure 4A:
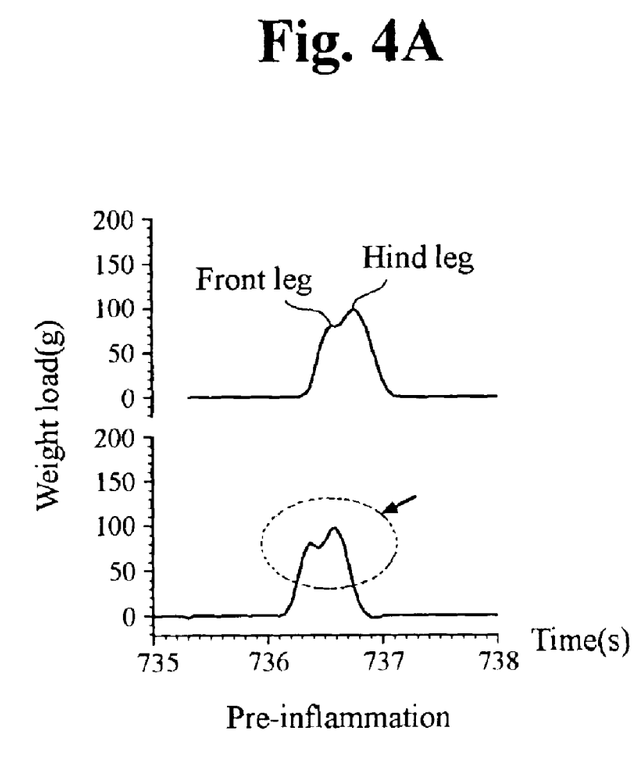
FIGS. 4A and 4B are graphs representing the weight loads exerted by both right and left legs before and after induction of arthritis, respectively.
Figure 4B:
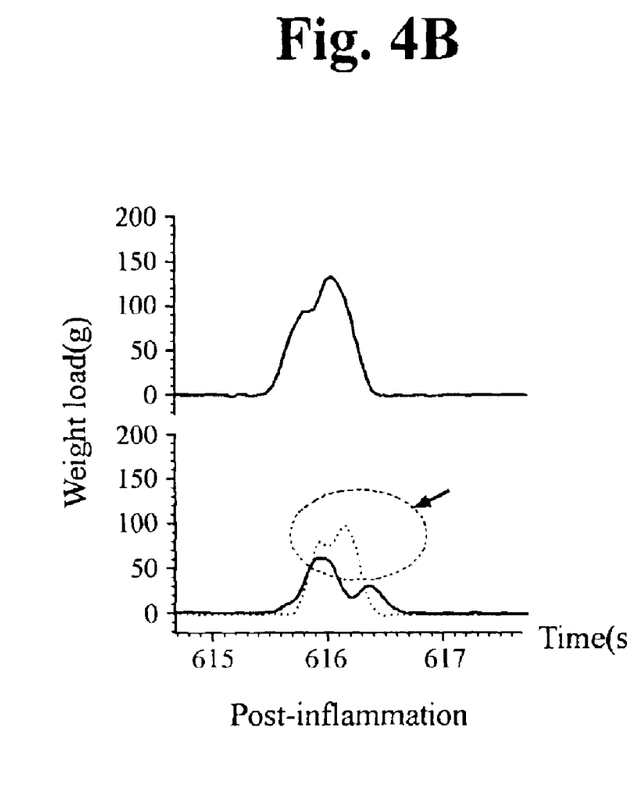

Referring to FIGS. 4A and 4B, which are graphs representing the weight loads exerted by both right and left legs before and after induction of arthritis, respectively, the first and second peaks represent the weight loads on the front and hind legs, respectively. As indicated by curve (b) showing weights after inflammation, the weight load on the arthritic right leg decreases with time while the weight load on the non-arthritic left leg increases, because more body weight of the lab animal would be gradually shifted to a leg that does not hurt.

Figure 5A:
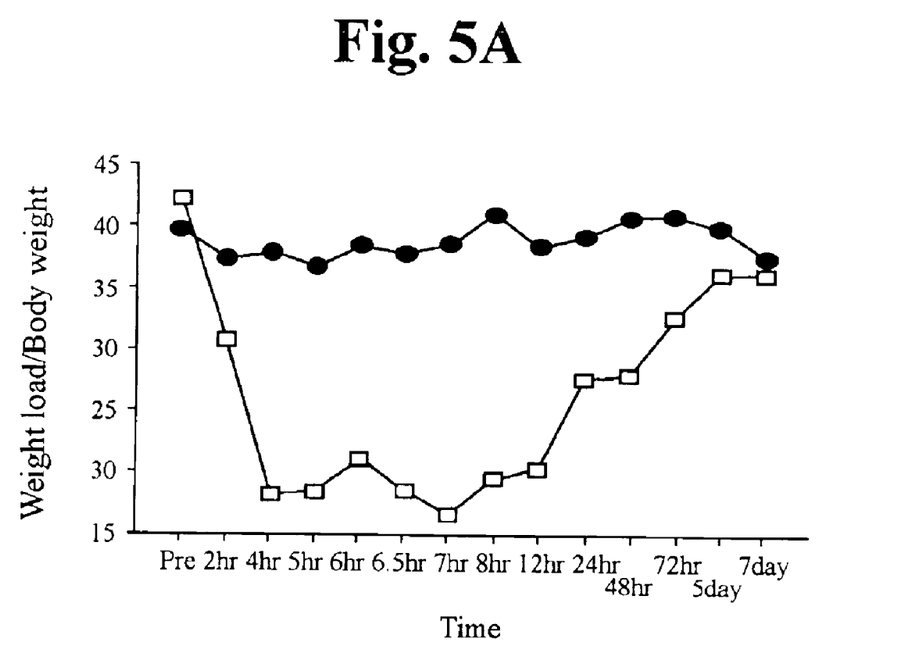
FIGS. 5A and 5B illustrate graphs for comparing changes of the weight loads in a control group and an inflamed group.
Figure 5B:
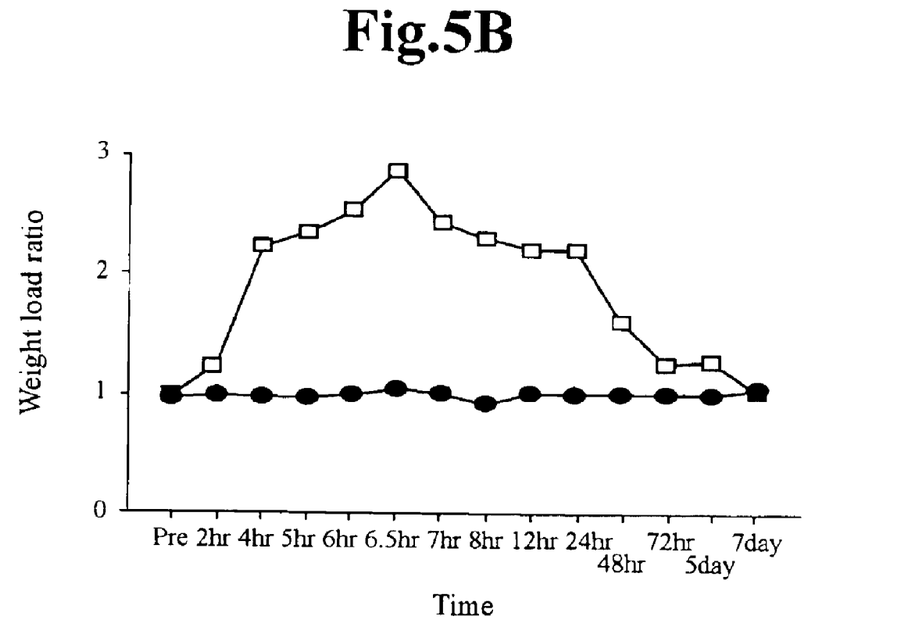

Now, reference is made to FIGS. 5A and 5B, which are graphs for comparing changes in the weight loads in the control group and the test group. FIG. 5A shows a change in the weight load on the right leg, while FIG. 5B illustrates a ratio of a right-leg weight load to a left-leg weight load. In these graphs, the symbol "□" represents a mean value of the control group and the symbol "●" represents that of the test group. Referring to these drawings, in the test group, the decrease of the weight load starts from two hours after arthritis was induced. The decrease in the weight load is greatest after 4 hours. The decrease is gradually lessened starting from the 6th hour, and the weight load is recovered to the original level after seven days. In contrast, in the control group, the decrease/increase of the weight load on either leg is not observed.

Again, referring back to FIG. 3, the degree of pain due to the inflamed right leg can be evaluated on the basis of the weight load obtained in step S104 (step S105) on the hypothesis that animals would less rely on a hurting leg when walking. In other words, it is safely assumed that the severity of pain in a leg due to arthritis is inversely proportional to the weight load on the leg. This evaluation may be performed by computing a ratio of the weight load of the inflamed right leg to that of the normal left leg. The smaller the ratio is, the greater the severity of pain is.

Figure 6:
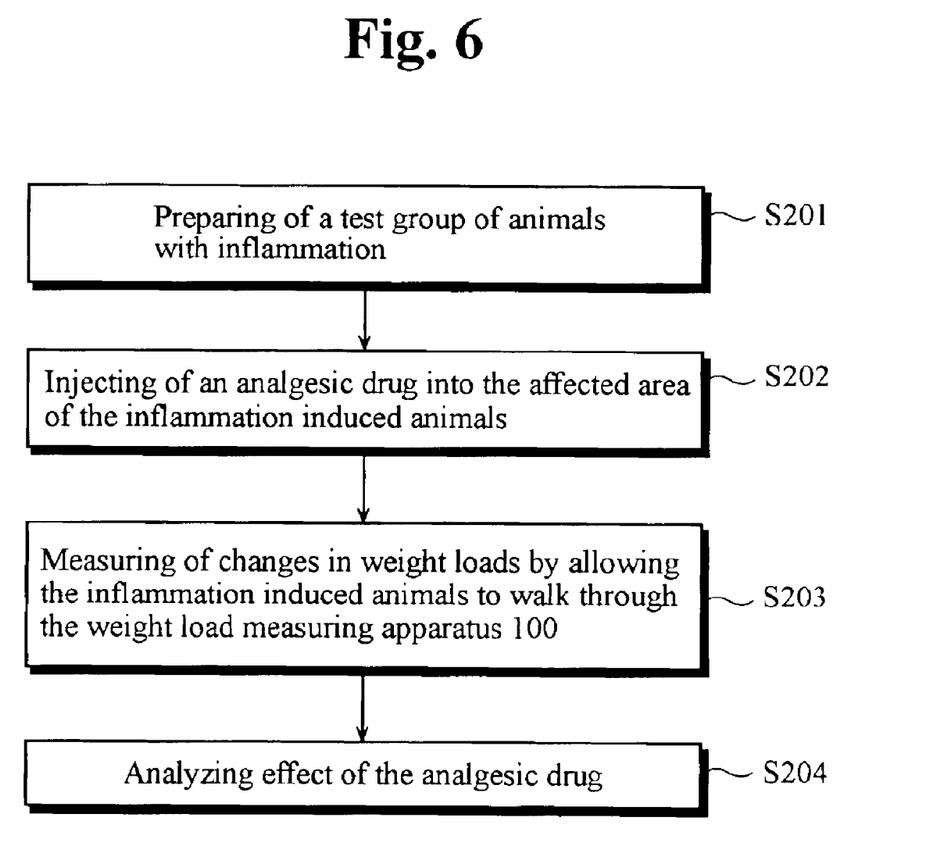
FIG. 6 is a flow chart of a method for analyzing the effects of the analgesic drug in accordance with the present invention.

Referring to FIG. 6, there is shown a flow chart of a method for analyzing the effects of an analgesic drug administered to arthritic animals in accordance with the present invention. Firstly, experimental animals are injected with an arthritis-inducing agent as mentioned above (step S201). Then, the arthritic animals are divided into two groups, one group being a test group and the other being a control group. After they show characteristic symptoms of arthritis, an analgesic drug of interest is injected into the affected areas of the test animals (step S202), while normal saline is injected into the same body area of the control group animals. Thereafter, the animals are made to periodically walk from starting box 1 to arrival box 3 of apparatus 100 one at a time. Their weight loads on the legs are measured (step S203). Then, based on information obtained in step S203, the effect of the analgesic drug on the pain is estimated by examining changes in the weight load on the legs (step S204) in just the same way changes in the weight loads were measured due to induced arthritis.

Figure 7:
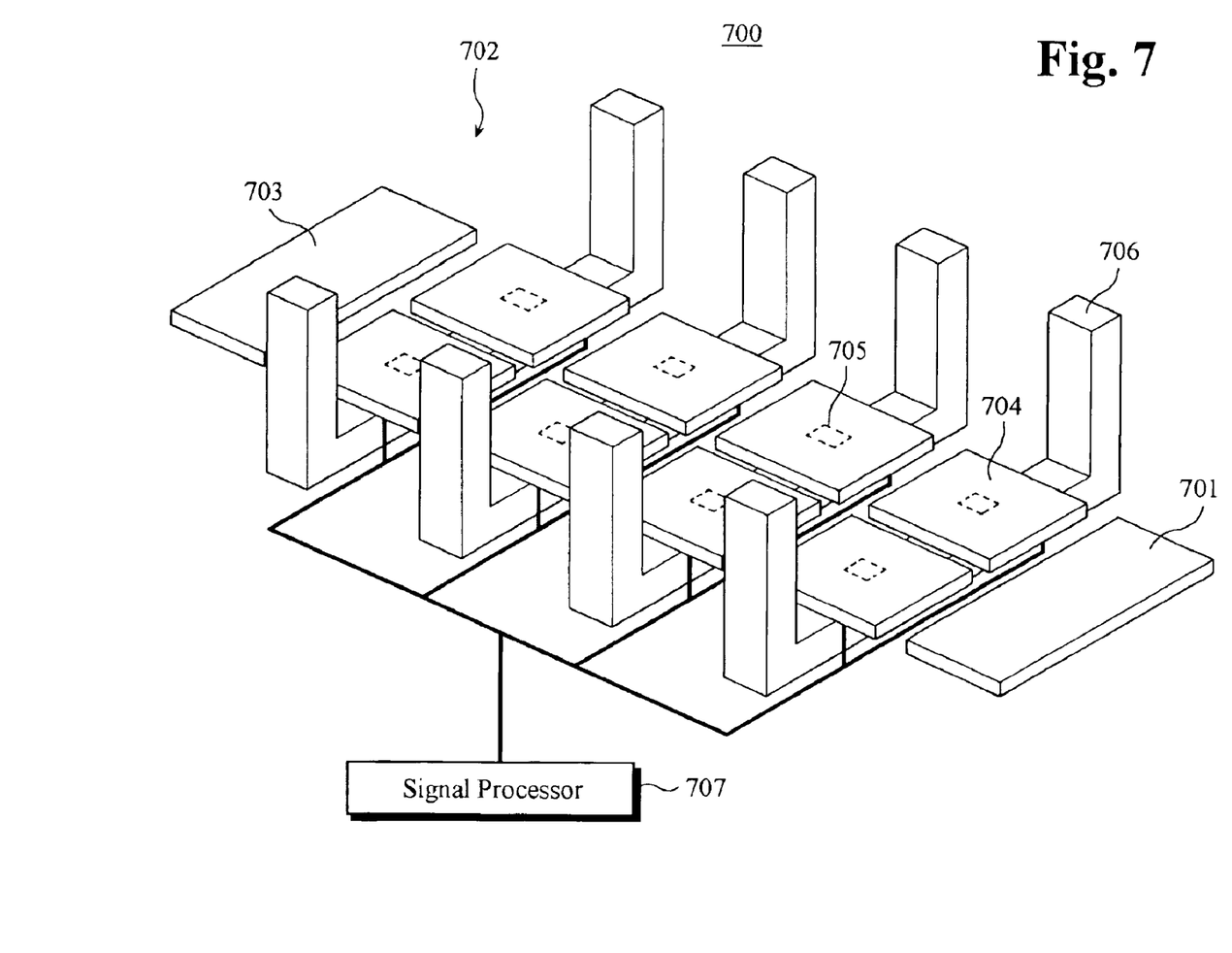
FIG. 7 shows an apparatus for measuring a weight load exerted by a foot of a human being in accordance with another embodiment of the present invention.

Referring to FIG. 7, there is shown an apparatus for measuring the weight load on a foot of a human patient. Apparatus 700 comprises starting platform 701, pathway 702, arrival platform 703, and signal processor 707.

Starting platform 701 and arrival platform 703 are located at the ends of pathway 702. Each of starting platform 701 and arrival platform 703 is made of a flat steel-like plate capable of enduring the weight of a patient. The bottom of pathway 702 consists of plates or footholds 704, which are detached from each other such that an action on one of footholds 704 does not affect the remainder. Footholds 704 are lined up in two rows. Preferably, each row has at least four plates in order to use the mean of measured weight loads, which is statistically more reliable. In general, the number of footholds 704 in one row should be selected to give a meaningful mean. The distance between the centers of each pair of footholds 704, one from each row, is adjusted to be about the same as the distance between the front and rear legs of each patient. Side-columns 706 are arranged on both side of each pair of footholds 704. Side-columns 706 are made of stainless steel and support footholds 704 such that footholds 704 may move up and down. The effect is that footholds 704 along pathway 702 may be adjusted in order to detect subtle differences of a weight load between normal and inflamed legs while the patient is going up stairs. Instead of side-columns 706, side-walls may be used.

In this pathway configuration, the patient is made to walk with the left foot stepping only on the left row of footholds 704 and the right foot stepping only the right row. Weight sensor 705 is attached to each of footholds 704 to record the weight load applied where the patient steps on footholds 704. Weight sensor 705 may be a load cell that converts an applied weight load to an electric signal corresponding to the applied weight load. Similar to apparatus 100 shown FIG. 1, signal processor 707 is electrically connected to weight sensors 705. Signal processor 707 receives the electric signal generated by each of weight sensors 705 and processes it to express the weight load numerically and graphically. Signal processor 707 has a structure identical to that of signal processor 4 shown in FIG. 2.

Figure 8:
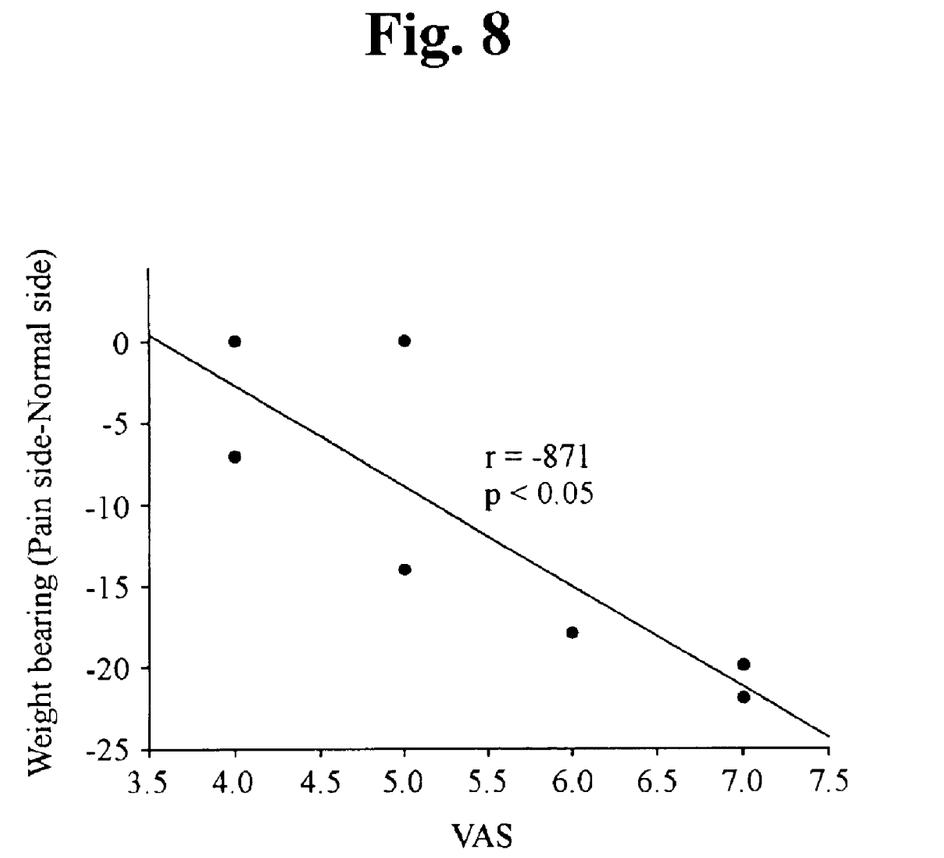
FIG. 8 is a graph showing correlation between the degree of the weight loads and the arthritic pain expressed by a patient.

Referring to FIG. 8, there is shown a graph showing correlation between the degree of the weight loads and the arthritic pain expressed by a patient. In FIG. 8, "VAS" stands for visual analogue scale which means the degree of pain that a patient expresses subjectively. As shown, the weight load had negative correlation with VAS. That is, the more sever arthritic pain, the less weight load.

As with the method associated with FIG. 3, and similar to the tested lab animal, the degree of pain due to the inflamed leg of a human patient may be evaluated on the basis of the weight load obtained on the hypothesis that the patient would rely less on the hurting leg when walking. This evaluation may be performed by computing a ratio or a difference of the weight load of the inflamed leg to that of the normal leg.

As with the method associated with FIG. 6, the effects of an analgesic drug administrated to and/or medical treatment on arthritic patients may be analyzed. This analysis may be performed by measuring weight loads on the inflamed and normal legs of the patient.

Specifically, FIG. 6 is equally applicable to a method for analyzing the effects of an analgesic drug administered to an arthritic human patient in accordance with the present invention. First, the subject patients are injected with an arthristic-inducing agent as mentioned above (step S201). Then, the subject human patients are divided into two groups, one group being a test group and the other being a control group. In this step, instead of injecting the arthristic-inducing agent, the arthristic human patients and normal subject human may be divided into the test and control groups. After they show characteristic symptoms of arthritis, an analgesic drug of interest is injected into the affected areas of the patients (step S202), while normal saline is injected into the same body area of the control patients. Thereafter, the patients are made to periodically walk from starting platform 702 to arrival platform 703 of apparatus 700 one at a time. Their weight loads on the legs are measured (step S203). Then, based on information obtained in step S203, the effect of the analgesic drug on the pain is estimated by examining changes in the weight load on the legs (step S204) in just the same way changes in the weight loads were measured due to induced arthritis.

According to the present invention, time-varying changes in the weight load on the inflamed leg can be measured objectively and precisely without unnecessarily hurting the test animals or human patients. Moreover, the present invention helps to measure painful states more realistically because pain is estimated while the measurements of weight loads are taken in a realistic, ordinary walking environment. Such weight loads can be used as an objective index for evaluating the severity of pain due to illness that negatively affects motor skills. Conversely, the effect of analgesic drugs can also be reliably estimated.

While the present invention has been described and illustrated with respect to preferred embodiments of the invention, it will be apparent to those skilled in the art that variations and modifications are possible without deviating from the broad principles and teachings of the present invention. For example, the present invention can be applied equally to a case for analyzing various pains other than arthritic pain.

What is claimed is:

1. An apparatus for measuring a weight load of a human being, comprising:

a long-box comprised of side-walls and a bottom, wherein the bottom is comprised of a plurality of independent plates, the plates defining a pathway upon which the human being moves freely;

a plurality of weight sensors for measuring the weight load exerted by an individual leg of the human being, wherein each of the plurality of weight sensors is independently attached to a corresponding plate of the plurality of plates on the bottom of the long-box and independently measures the weight load while the human being walks freely; and a signal processing means for processing an electric signal from each of the plurality of weight sensors, in order to provide a result of the measured weight.

2. The apparatus of claim 1, wherein each of the plurality of plates is sized depending on a stride of the human being.

3. The apparatus of claim 2, wherein the plurality of plates are arranged along two rows.

4. The apparatus of claim 1, wherein each of the plurality of weight sensors is a load cell.

5. The apparatus of claim 1, further comprising:

a starting platform connected to an end of the long-box; and an arriving platform connected to the other end of the long-box, wherein the human being is free to walk from the starting platform to the arriving platform through the long-box.

6. The apparatus of claim 1, wherein the result is represented by one of a numerical value and a graphical representation, the graphical representation being a time-dependent graph.

7. The apparatus of claim 1, wherein the long-box is comprised of side-columns substituting the side-walls and the bottom.

8. A method of measuring a weight load of a human being, comprising the steps of:

(a) providing a long-box comprised of side-walls and a bottom, wherein the bottom is comprised of a plurality of independent plates, the plates defining a pathway upon which the human being moves freely;

(b) allowing the human being to move through the long-box;

(c) measuring a weight load exerted by an individual leg of the human being through a plurality of weight sensors, wherein each of the plurality of weight sensors is independently attached to a corresponding plate of the plurality of plates on the bottom of the long-box and independently measures the weight load while the human being walks freely; and (d) processing an electric signal from each of the plurality of weight sensors to provide information relating to the weight load.

9. The method of claim 8, wherein the long-box is comprised of side-columns substituting the side-walls and the bottom.

10. A method of analyzing effects of an analgesic drug and/or medical treatment on an inflamed leg of a human being, comprising the steps of:

(a) providing a box which includes a plurality of sensors attached to a bottom of the box;

(b) directing the human being to walk;

(c) measuring independently a first weight load exerted by the inflamed leg and a second weight load exerted by a normal leg;

(d) injecting an analgesic drug into and/or applying a medical treatment on the inflamed leg;

(e) measuring a third weight load exerted by the inflamed leg and a fourth weight load exerted by the normal leg, after the human being walks voluntarily through the box;

(f) computing a first ratio of the first weight load to the second weight load and a second ratio of the third weight load to the fourth weight load;

(g) calculating a difference between the first and second rations; and (h) determining the effects of the analgesic drug and/or the medical treatment before and after the administration of the analgesic drug into and/or the application of the medical treatment on the inflamed leg, on the basis of the calculated difference.

11. The method of claim 10, wherein measured weight loads are recorded as one of a numerical value and a time-dependent graph.

12. A method of evaluating severity of pain in an inflamed leg of a human being, comprising the steps of:

(a) measuring a first weight load exerted by the inflamed leg and a second weight load exerted by a normal leg, wherein the measuring step (a) further comprises the steps of:

(i) providing a long-box comprised of side-walls and a bottom, wherein the bottom is comprised of a plurality of independent plates, the plates defining a pathway on which the human being moves freely;

(ii) directing the human being to move through the long-box;

(iii) detecting the first and second weight loads exerted by the inflamed leg and the normal leg, respectively, of the human being through a plurality of weight sensors, wherein each of the plurality of weight sensors is independently attached to a corresponding one of the plurality of plates on the bottom of the long-box and independently measures the weight load; and (iv) processing electric signals from the plurality of weight sensors to provide information relating to the first and second weight loads exerted by the inflamed leg and the normal leg of the human being, and (b) evaluating severity of pain on the basis of the information relating to the first and the second weight loads, wherein the evaluating step (b) further comprises the steps of:

(i) computing a ratio of the first weight load to the second weight load; and (ii) comparing the ratio with a predetermined number to grade the severity of pain.

13. The method of claim 12, wherein the pain is an arthritic pain.

14. The method of claim 12, wherein the long-box is comprised of side-columns substituting the side-walls and the bottoms.

* * * * *